3,326,748
CONTROL OF POWDERY MILDEW WITH ZINC AND ANTIMONY N,N-DIBUTYLDITHIOCARBAMATES
Ivan C. Popoff, Ambler, and Alfred Case Whiton, Norristown, Pa., assignors to Pennsalt Chemicals Corporation, Philadelphia, Pa., a corporation of Pennsylvania
No Drawing. Filed May 11, 1964, Ser. No. 366,616
5 Claims. (Cl. 167—22)

This invention relates to a method for the control of powdery mildew and to compositions which provide excellent powdery mildew control. More particularly, the invention is concerned with the use of zinc and antimony salts of dibutyldithiocarbamates as active agents for control of powdery mildew.

Powdery mildew is a fungus which causes numerous diseases on fruits, vegetables, berries, flowers, tobacco, grasses and cereals, and such diseases are responsible for large economic losses in the agricultural field. Powdery mildew of roses, strawberries, peaches, peas, clover, grasses and cereals is caused by the mildew of the erysiphaceae family. Powdery mildews of applies, cherries and other fruits is caused by species in the podosphaceace. Other examples of the wide variety of powdery mildew diseases are indicated at pages 583 to 586 of the text by Heald, "Manual of Plant Diseases," 1933, McGraw-Hill Book Company, Inc. The causal organisms of powdery mildew belong to several genera of fungi having a morphological and psysiological similarity in that they possess mycelium and fruiting structures which are resistant to desiccation and which can exist on the plant leaf or stem. The group is quite resistant to most organic fungicides presumably because of this marked difference from other fungi which live internally in the host tissues.

Heretofore, powdery mildew has been treated by numerous techniques, but none of them is entirely satisfactory. Lime-sulfur mixtures are often effective, but are limited in their use to well-pruned, well-cared for orchards because of possible phytotoxic effects on foliage. Other commercial, agricultural fungicides, such as the zinc and iron salts of dimethyldithiocarbamic acid, the zinc and manganese salts of ethylene-bis-dithiocarbamic acid (Zineb and Maneb) are not as effective as lime-sulfur, and 4,6-dinitro-2-capylphenyl crotonate (Karathane) has a limited range of safety to plant foliage. Thus, although some of these known fungicides show activity against powdery mildew, they are limited either in effectiveness or safety to plant foliage.

It has now been found, in accord with this invention, that powdery mildew may be controlled effectively and economically by using as the active agent an N,N-dibutyldithiocarbamic acid salt of zinc and antimony. More particularly, the active agents employed in this invention have the structure

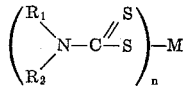

where $R_1$ and $R_2$ are butyl groups and are preferably normal butyl or isobutyl groups, and may be the same or different, M is zinc or antimony, and $n$ is an integer of two or three corresponding to the valence of M. Further, in accord with this invention, control of powdery mildew on plants may be obtained by treating said plants with a composition comprising a carrier and a powdery mildew controlling amount of the zinc or antimony dibutyldithiocarbamate salt described above.

The procedures which will be used for applying the fungicidal composition to the plants will be in accord with usual practices. Since the active compound has limited water solubility, the active compounds will usually be applied to the plants as an aqueous dispersion which is preferably obtained from a wettable powder. In a preferred embodiment of the invention, the concentrate of the active agent, together with a carrier and containing a surfactant, will be manufactured and sold as an article of commerce. Preferably, this concentrate will be in the form of a wettable powder, made simply by blending the dithiocarbamate salt with a carrier, such as a clay or other finely divided or particulate inert matter, e.g., attapulgite, bentonite, vermiculite, and the like. As a surfactant, there may be used one or more of the many surface active agents generally employed, such as a polyalkylene oxide, a ligninsulfonate, or the various other cationic, anionic, and nonionic surfactants available for such purposes. Generally, the wettable powder concentrate will contain for about 5 to about 90% by weight of an active agent, the balance being the carrier and surfactant.

Alternatively, the active agents may be formulated in organic solvent systems as a solution or emulsion concentrate containing from 5 to 90% by weight of active agent and the organic solvent system dispersed in water just prior to use. Generally, the organic material will be an aromatic hydrocarbon solvent, such as xylene, toluene, etc., but other solvent systems, such as ketones (methyl ethyl ketone, acetone, etc.), aliphatic amides such as dimethylformamide, dimethylacetamide, ketoalcohols (diacetone alcohol) and the like, may also be used.

The rate of application of the fungicides onto the plant, flower or crop to be treated will vary between about 0.65 to 5.0 pounds per acre of active material. Preferably, and for economic reasons, the rate of application will be from 0.65 to 1.25 pounds per acre, or from 0.5 to 2 pounds per gallon for tree applications. Because the dibutyldithiocarbamic acid salts of zinc and antimony as above described are so effective, this very low concentration may be used. Application is made in the usual manner by spraying an aqueous dispersion of the agent onto the plant and treatment in this manner enables control of powdery mildew to be obtained.

In order to more fully illustrate the invention, the following examples are given.

EXAMPLE 1.—FORMULATIONS USEFUL

A. *Wettable powder*

Percent by weight
Zinc di-n-butyldithiocarbamate _____ 50
Surfactants:
    Sodium lignosulfonate ("Marasperse" N) _____ 2
    Alkylphenoxypoly(ethyleneoxy)ethanol
        ("Igepal," RC-760) _____ 2
Carrier: Attapulgite ("Attaclay") _____ 46

B. *Aqueous ball milled dispersion*

Ten parts by weight of the antimony salt of di-n-butyldithiocarbamate and 90 parts by weight of water are ball milled in the presence of an alkyl urea polyether alcohol surfactant until a stable dispersion is obtained.

EXAMPLE 2.—EVALUATION OF AGENTS

The active agents were evaluated by spraying snap (green) bean plants in pots with a water dispersion containing 25% by weight of active agent, the spraying being done to provide various known rates of application to the plant. Subsequent to the spray treatment, plants were inoculated with cultures of powdery mildew (*Erysiphe polygoni*). The treated plants were inspected after 2 weeks and the area of infected leaves was determined and kill of the fungi expressed as percentage of the control which was usually 95% to 100% infected. The following table indicates the results obtained with various dithiocarbamate salts as well as with related compounds.

TABLE 1.—EFFECT OF VARIOUS AGENTS ON POWDERY MILDEW

| Agent | Rate per Acre Applied | | | |
|---|---|---|---|---|
| | 0.65 | 1.25 | 2.5 | 5.0 |
| | Percent Kill | | | |
| $[(n\text{-}C_4H_9)_2\text{-}N\text{-}\overset{S}{\overset{\|}{C}}\text{-}S\text{-}]_2 Zn$ | 99 | 99 | | |
| $[(i\text{-}C_4H_9)_2\text{-}N\text{-}\overset{S}{\overset{\|}{C}}\text{-}S\text{-}]_3 Sb$ | 100 | 100 | 98.4 | 98.4 |
| $[(n\text{-}C_4H_9)_2\text{-}N\text{-}\overset{S}{\overset{\|}{C}}\text{-}S\text{-}]_3 Sb$ | 93 | 92 | | 98 |
| $[(C_5H_{11})_2\text{-}N\text{-}\overset{S}{\overset{\|}{C}}\text{-}S\text{-}]_3 Sb$ | 30 | | | |
| $(n\text{-}C_4H_9\text{-}NH\text{-}\overset{S}{\overset{\|}{C}}\text{-}S\text{-})_3 Sb$ | 35 | | | |
| $(n\text{-}C_4H_9\text{-}NH\text{-}\overset{S}{\overset{\|}{C}}\text{-}S\text{-})_2 Zn$ | 51 | | | |
| Ziram (zinc dimethyldithiocarbamate) | 0 | | | |
| Ferbam (ferric dimethyldithiocarbamate) | 0 | | | |
| Zineb (zinc salt of ethylene bis-dithiocarbamate) | 20 | | | |
| Captan (N-(trichloromethylthio)4-cyclohexene-1,2-dicarboximide) | 65 | | | |

It is clear from the above table that the zinc and antimony dibutyldithiocarbamates are extremely effective at low concentrations against powdery mildew. On the other hand, closely related compounds such as the antimony salt of diamyldithiocarbamate and the corresponding zinc and antimony monobutyldithiocarbamates show little powdery mildew control. Likewise, commercial agents, such as "Ziram," "Ferbam," "Captan," and "Zineb" offer little control against powdery mildew fungus.

It will be understood that numerous variations and modifications may be made from the description and examples given above without departing from the spirit and scope of the invention.

We claim:

1. A method for controlling powdery mildew on plants, which comprises applying to said plants a powdery mildew controlling amount of a metal dibutyldithiocarbamate wherein said metal is a member selected from a group consisting of zinc and antimony.

2. The method of claim 1 in which the amount of active agent is from 0.65 to 1.25 pounds per acre.

3. A method for the control of powdery mildew on plants which comprises treating said plants with an amount of antimony di-n-butyldithiocarbamate ranging from 0.65 to 1.25 pounds per acre.

4. A method for the control of powdery mildew on plants which comprises treating said plants with an amount of antimony di-i-butyldithiocarbamate ranging from 0.65 to 1.25 pounds per acre.

5. A method for the control of powdery mildew on plants which comprises treating said plants with an amount of zinc di-n-butyldithiocarbamate ranging from 0.65 to 1.25 pounds per acre.

References Cited

UNITED STATES PATENTS

| 1,972,961 | 9/1934 | Tisdale et al. | 167—22 |
| 2,716,089 | 8/1955 | Cyphers et al. | 167—22 X |
| 2,875,834 | 3/1959 | Shumard | 167—22 |

OTHER REFERENCES

Webster, 7th New Collegiate Dictionary, G. & C. Merriam Co., Springfield, Mass., 1963, p. 537.

ALBERT T. MEYERS, *Primary Examiner.*

JULIAN S. LEVITT, *Examiner.*

VERA C. CLARK, *Assistant Examiner.*